(12) United States Patent
Draese et al.

(10) Patent No.: US 10,174,271 B2
(45) Date of Patent: Jan. 8, 2019

(54) METHOD FOR SEPARATING A COOLING LUBRICANT AGENT FROM A BEARING LUBRICANT

(71) Applicant: Hydro Aluminium Deutschland GmbH, Cologne (DE)

(72) Inventors: Stephan Draese, Nettetal (DE); Oliver Seifferth, Cologne (DE)

(73) Assignee: Hydro Aluminium Deutschland GmbH, Köln (DE)

( * ) Notice: Subject to any disclaimer, the term of this patent is extended or adjusted under 35 U.S.C. 154(b) by 1031 days.

(21) Appl. No.: 14/372,425

(22) PCT Filed: Jan. 16, 2013

(86) PCT No.: PCT/EP2013/050742
§ 371 (c)(1),
(2) Date: Jul. 15, 2014

(87) PCT Pub. No.: WO2013/107768
PCT Pub. Date: Jul. 25, 2013

(65) Prior Publication Data
US 2015/0001062 A1 Jan. 1, 2015

(30) Foreign Application Priority Data
Jan. 16, 2012 (DE) .................. 10 2012 000 588

(51) Int. Cl.
| | | |
|---|---|---|
| *C10M 169/04* | (2006.01) | |
| *C10M 175/00* | (2006.01) | |
| *B21B 45/02* | (2006.01) | |
| *B01D 3/00* | (2006.01) | |

(52) U.S. Cl.
CPC .............. *C10M 169/04* (2013.01); *B01D 3/00* (2013.01); *C10M 175/0033* (2013.01); *C10M 2203/1006* (2013.01); *C10M 2205/0285* (2013.01); *C10M 2207/003* (2013.01); *C10M 2207/026* (2013.01); *C10M 2207/2805* (2013.01); *C10M 2209/1033* (2013.01); *C10M 2209/1045* (2013.01); *C10M 2209/1055* (2013.01); *C10M 2209/1065* (2013.01); *C10M 2209/1075* (2013.01); *C10M 2209/1085* (2013.01); *C10M 2215/064* (2013.01); *C10N 2220/00* (2013.01); *C10N 2220/021* (2013.01); *C10N 2220/022* (2013.01); *C10N 2220/144* (2013.01); *C10N 2230/00* (2013.01); *C10N 2230/02* (2013.01); *C10N 2240/02* (2013.01); *C10N 2240/402* (2013.01); *C10N 2240/405* (2013.01); *C10N 2240/407* (2013.01)

(58) Field of Classification Search
CPC . F10N 39/005; F16N 2200/00; F16N 2210/14
USPC ...................................................... 508/110
See application file for complete search history.

(56) References Cited

U.S. PATENT DOCUMENTS

| | | | |
|---|---|---|---|
| 3,265,212 A | 8/1966 | Bonsall, Jr. | |
| 3,663,437 A | 5/1972 | Moore et al. | |
| 3,793,184 A | 2/1974 | Loftus | |
| 4,101,414 A | 7/1978 | Kim et al. | |
| 7,303,693 B2 | 12/2007 | Fahl et al. | |
| 2007/0199359 A1 | 8/2007 | Rajagopalan et al. | |
| 2008/0026967 A1* | 1/2008 | Suda .................... | C10M 101/00 508/459 |
| 2011/0230377 A1* | 9/2011 | Seiferth .............. | C10M 173/00 508/110 |

FOREIGN PATENT DOCUMENTS

| | | |
|---|---|---|
| CN | 104088280 | 10/2014 |
| DE | 1 594 535 | 7/1970 |
| DE | 2628763 | 5/1981 |
| DE | 4343609 | 6/1995 |
| DE | 10164056 | 7/2003 |
| EP | 0568038 | 11/1993 |
| EP | 0712834 | 5/1996 |
| GB | 163056 | 5/1921 |
| GB | 1412483 | 11/1975 |
| GB | 2117787 | 10/1983 |
| JP | 2008088428 | 4/2008 |
| JP | 2009001611 | 1/2009 |
| WO | 2010060765 | 6/2010 |

OTHER PUBLICATIONS

State Intellectual Property Office of P.R.C. (SIPO) Search Report, dated Aug. 17, 2015 (2 pages).
Merck KGaA: Sicherheitsdatenblatt Diphenylamin, URL: http://www.merckmillipore.com/germany/diphenylamin/MDA_CHEM-820528/p_PcWb.s1LBSYAAAEWIOEfVhTI [abgerufen am May 15, 2012]—downloaded from site on Jan. 18, 2016 (4 pages).
Kussi, "Polyethers as Base Fluids to Formulate High Performance Lubricants", Lubrication Engineering, 47 (11):926-933, 1991.
German language encyclopedia excerpt for the term "bore/cutting oil" from Römpp's Chemical Encyclopedia. The passage states that bore/cutting oils usually are emulsions of mineral oils in water, Römpp-Lexikon Chemie, Georg Thieme Verlag, Stuttgart 1996, 10, Aufl., Band 1, p. 488, "Böhrole".
Suilin, Jia et al., "Application of TD Locomotive Traction Gear Grease", from Shaofeng Zhang, "Industrial Lubrication and Industrial Lubricants", Synthetic Lubricants, Issue 3, 2001, pp. 26-31.
Translation of the paragraph 4.1.5 from Suilin et al., one page.

(Continued)

*Primary Examiner* — Prem C Singh
*Assistant Examiner* — Francis C Campanell
(74) *Attorney, Agent, or Firm* — Honigman Miller Schwartz and Cohn LLP

(57) ABSTRACT

The present invention relates to a method for reconditioning bearing lubricants that can be used in equipment for metal working, in which cooling lubricant that can be used in equipment for metal working is separated from the bearing lubricant. In addition the invention relates to a bearing lubricant for use in the method according to the invention.

10 Claims, No Drawings

(56) References Cited

OTHER PUBLICATIONS

Schimion, Werner, "Synthetic Lubricant for Cold Rolling Aluminum and Aluminum Alloy Sheets in Tandem, Mill", Light Alloy Fabrication Technology, 10:15-21, 1985.
Jiang, Shuyun, "Tribological Properties of Large pv Pivot Jewel Bearing Lubricated with Various Oils", China Mechanical Engineering, 14(5):410-412, 2003.
Database WPI, Week 200864, Thomson Scientific, London, GB; AN 2008-K74932, XP002695440, & JP 2008088428 A.

* cited by examiner

METHOD FOR SEPARATING A COOLING LUBRICANT AGENT FROM A BEARING LUBRICANT

CROSS-REFERENCE TO RELATED APPLICATIONS

This application claims priority from PCT application PCT/EP2013/050742, filed on Jan. 16, 2013, which claims priority from German application DE 10 2012 000 588.1, filed on Jan. 16, 2012, the entire contents of which are incorporated by reference.

The invention relates to a separation method for reconditioning bearing lubricant used in equipment for metal working. In addition the invention relates to a bearing lubricant that can be used in bearings in equipment for metal working.

In equipment for metal working, for example in aluminium cold rolling mills, as a rule non water-miscible cooling lubricants in the form of low aromatic content hydrocarbon mixtures are used as cooling lubricant for the forming process. Depending on the specific application suitable lubricating additives, for example fatty alcohols, fatty acids or fatty acid esters, can be added to the cooling lubricants.

In aluminium cold rolling mills, in addition to cooling lubricants also further lubricants, for example bearing lubricants, are used in closed circuits and at total loss lubrication sites. High-boiling and highly viscous lubricants used on mineral oils are normally used as bearing lubricants.

A leakage from these lubricant circuits into the cooling lubricant cannot be completely prevented according to the present state of the art. Such leakages are critical for the rolling process, in particular when using high-boiling and highly viscous bearing lubricants, since various properties of the cooling lubricant, or example its viscosity and purity, are adversely affected. The aforementioned leakages are particularly critical for the further production processes of the metal working, which include a thermal treatment of the rolled strip in order to adjust the metallurgical properties and/or to evaporate the oil coating. The high boiling point and the chemical composition of the bearing lubricant entail in fact that the bearing lubricant does not evaporate completely at high temperatures, such as occur for example during thermal degreasing. Undesirable deposits are thus formed on the rolled strip. The formation of such deposits is termed "brown spotting" on account of the accompanying change in colour of the rolled strip.

In order to prevent deterioration of the quality, it is normal to reduce the content of bearing lubricant impurities in the cooling lubricant by regular replacement of the cooling lubricant filling. This procedure is disadvantageous however, since it involves costs in the procurement of the cooling lubricant, and the reconditioning and disposal of the contaminated cooling lubricant. In addition the thermal treatment of the rolled strip has to be adapted to the content of bearing lubricant impurities in the cooling lubricant, which is sometimes laborious to determine. This results in time-, energy- and investment-intensive processes, especially in the thermal degreasing of aluminium rolled products.

In oil-flood lubricated bearings for roll necks on aluminium cold rolling mills, high-boiling mineral oils are normally used as bearing lubricants. As already discussed, in the current state of sealing technology leakages of bearing lubricant into the cooling lubricant cannot be prevented. Leakages of bearing lubricant from oil film bearings for roll necks into the cooling lubricant are particularly critical for the process, since such bearing lubricants are normally significantly more viscous than cooling lubricants and in addition have a much higher boiling point. The viscosity and boiling point of the cooling lubricants are thus particularly adversely affected by leakages of such bearing lubricants.

The extent of the contamination of the cooling lubricant by bearing lubricants depends inter alia on the leakage rate from the bearing lubricant systems. With a high leakage rate the amounts of bearing lubricant in the cooling lubricant may account for the majority of the cooling lubricant contaminations that are critical for the process.

Another complication is that with the current sealing technology it is presently not possible to exclude leakages of cooling lubricant into the bearing lubricant system—i.e. the reverse process. Such leakages contribute to the deterioration of the above-mentioned situation. Due to the penetration of the cooling lubricant into the bearing lubricant system there may be a drop in the viscosity of the bearing lubricant, which greatly reduces the lubricating quality of the bearing lubricant and can thus lead to bearing damage. In order to prevent a cooling lubricant contamination leading to a drop in viscosity in the bearing lubricant system, particularly highly viscous and high boiling mineral oils are in fact added to the bearing lubricant. Such a modified bearing lubricant is then—in the event of a leakage into the cooling lubricant—even more critical for the production process than the unmodified bearing lubricant.

Normally the impairment of the production process in the event of a leakage from the bearing lubricant circuit into the cooling lubricant circuit increases with increasing operating life of the filling of the bearing lubricant system.

It is known to recondition cooling lubricant in order to remove contaminants such as bearing lubricants from the cooling lubricant. Thus, patent application publication 1 594 535 describes a method for purifying used rolling mill oil that contains water, solids and tramp oils as impurities. In this method the impurities are removed by settling and centrifuging them off from the rolling mill oil.

The object of the present invention is to overcome the disadvantages of the known separation method. In particular a method should be provided by means of which mixtures of bearing lubricant and cooling lubricants can be effectively separated with minimum effort, wherein it is the particular object of the separation method to remove from the bearing lubricant leakages of cooling lubricant into the bearing lubricant and to preserve via this regeneration of the bearing lubricant the viscosity and thus the lubricating quality of the bearing lubricant. The object of the invention is also to provide a bearing lubricant, in particular for use in oil-flood lubricated bearings in equipment for metal working, which is sufficiently compatible with cooling lubricant and can advantageously be employed in the method according to the invention, and in addition has the advantage compared to the normally employed bearing lubricants that leakages of bearing lubricant into the cooling lubricant can be removed in a simple way from the cooling lubricant, preferably by a cooling lubricant filtration. Finally, the object of the invention is to provide a bearing lubricant, in particular for use in oil-flood lubricated bearings in equipment for metal working, which is particularly compatible with cooling lubricant, which can be used in an advantageous manner in the method according to the invention, which in the event of a leakage into the cooling lubricant can be removed in a simple manner from the cooling lubricant, preferably by a cooling lubricant filtration, and which in the event of leakage into the cooling lubricant in a thermal degreasing of the rolled strip produced with the cooling lubricant, does not form any undesirable deposits on the rolled strip.

According to a first teaching of the present invention this object is achieved by a method for reconditioning bearing lubricants that can be used in equipment for metal working, in which cooling lubricant that can be used in equipment for metal working is separated from the bearing lubricant.

It was recognised that the separation of cooling lubricant from mixtures of bearing lubricant and cooling lubricant constitutes a particularly process-compatible separation method.

The method according to the invention is suitable in particular for removing rolling oil leakages from oil-flood lubricated bearings for roll necks on aluminium cold rolling mill stands or their bearing lubrication systems.

The separation of the cooling lubricant from the oil-flood lubricated bearing lubricant can be accomplished in various ways known to the person skilled in the art, for example by means of separators. The separation by means of separators is possible if the cooling lubricant and bearing lubricant are not miscible with one another or the cooling lubricant does not dissolve, or only to a very limited extent, in the bearing lubricant, or in so far as multi-phase systems can be established by adding adsorbents or solvents promoting the separation. Considerable restrictions are thus placed on the selection and use of the cooling lubricants bearing lubricants employed in equipment for metal working.

Practical tests have shown that particularly good results can be achieved with separation methods that utilise the mutually differing thermal properties of bearing lubricant and cooling lubricant. Thus, with thermal separation methods complicated process steps can be avoided, such as for example the addition of adsorbents or solvents that promote the separation. Another advantage of thermal separation is that it can be carried out with a good miscibility as well as a poor miscibility of cooling lubricant and bearing lubricant. In addition a thermal separation is characterised by a high selectivity. A further advantage of a thermal separation is that further low boiling impurities of the bearing lubricant, such as for example water, are automatically separated at the same time.

The method according to the invention is in principle suitable for separating all normally used cooling lubricants from the normally used bearing lubricants. Particularly good separating efficiencies are obtained in the separation of non-water-miscible cooling lubricants according to DIN 51385, in particular cooling lubricants that contain hydrocarbons, preferably in an amount of at least 50 weight %, preferably at least 70 weight %, and in particular at least 90 weight %. It is advantageous if the boiling point of the cooling lubricant is in the range from 180° to 320° C. In addition cooling lubricants that at 40° C. have a kinematic viscosity according to DIN 51562-T1 of at most 10 $mm^2$/sec, preferably 1 to 5 $mm^2$/sec, more preferably from 1.5 to 3.5 $mm^2$/sec and in particular at most 3 $mm^2$/see, are especially suitable.

Preferably the separation of the cooling lubricant from the bearing lubricant is carried by a distillative method. As is known, distillative methods utilise the variously high boiling points of the involved substances. At a certain temperature the vapour pressure of the substance with the lower boiling point, for example the cooling lubricant, is higher than the vapour pressure of the substance with the higher boiling point, for example the bearing lubricant. The substance with the lower boiling point thus accumulates in the gas phase and/or is accordingly depleted in the liquid phase. By means of a selectively effected condensation of the gaseous phase—preferably spatially separated from the original liquid—a liquid is obtained whose composition corresponds to the gas phase. In a continuous distillation process the various substances can thus be effectively separated.

In order to achieve a high selectivity it is preferred to use a bearing lubricant whose flash point is at least 50° C., preferably at least 70° C. and in particular at least 90° C. higher than the flash point of the employed cooling lubricant.

In a further advantageous embodiment of the method according to the invention the distillative separation of the cooling lubricant is carried out at reduced pressure (vacuum), in particular at a pressure of less than one atmosphere, and/or at an elevated temperature, in particular at a temperature of more than 25° C. Good results are normally obtained by adjusting the distillation temperature to values between 25° C. and 180° C., preferably between 50° C. and 160° C. Distillation temperatures of at most 150° C., preferably from 50° C. to 130° C., and in particular from 70° C. to 110° C., are particularly suitable.

As is known to the person skilled in the art, the boiling points of the substances to be separated can be reduced according to their vapour-pressure curve by lowering the pressure. Preferably the distillative separation of the cooling lubricant is carried out at a pressure of less than 5 mbar, preferably from 0.1 mbar to 3 mbar, and in particular 0.5 mbar to 2 mbar.

The use of low distillation temperatures is therefore advantageous since the thermal energy expenditure required for the distillative separation is reduced. In addition the products to be separated are preserved. Thus, at low temperatures undesirable oxidative and/or thermal processes initiated by the thermal action that adversely affect the chemical composition and physical properties, in particular the lubricating quality of the bearing lubricant, such as for example oil oxidation, oil sludge formation (polymerisation) or decomposition, can be reduced or even completely avoided. The gentle nature of the distillative separation can furthermore be promoted by short residence times of the lubricants in the separating apparatus.

It is possible to carry out the distillative separation of the cooling lubricant from the hearing lubricant in the form of a bubble distillation.

Preferably a falling-film evaporator used for the distillative separation of the cooling lubricant. Falling-film evaporators preferably consist of a vertical bundle of long tubes, in which the liquid to be distilled is introduced from above and flows down in the form of a film. In the jacket space the heating is effected for example by steam. In the tubes vapour bubbles form that flow downwards with the liquid and produce turbulent conditions. Vapour and liquid are separated at the lower end, normally in a separation vessel.

In a further particularly advantageous embodiment of the method, a method based on thin-film distillation or short-path distillation is carried out for the distillative separation of the cooling lubricant.

In these methods the evaporation of the cooling lubricant takes place from a thin film in the interior of a preferably cylindrical tube. This film contains the bearing lubricant as main component and is constantly mixed via a wiper system. The heating of the evaporator wall advantageously takes place from outside via a double jacket.

The methods mentioned above have, compared for example to bubble distillations, inter alia the advantage that they can be carried out at very low pressure and thus also at low temperatures. In addition the products can be removed very quickly from the separation apparatus and can thus be supplied quickly for further use. For this reason these methods are particularly gentle as regards the products to be separated. In addition thin-film and short-path distillation methods are also outstandingly suitable for highly viscous media and therefore in particular for the bearing lubricants used in metal working plants, which at 40° C. normally have a kinematic viscosity according to DIN 51526-T1 of more than 30 min²/sec.

The separation method according to the invention can be carried out in the side stream or in the full flow of the bearing lubricant circuit. With a purification in the side stream it is advantageous that the circulation of the bearing lubricant does not experience any interference and accordingly operation of the metal forming equipment can be continuously maintained. Constant process conditions can thus be maintained in the case of purification in the side stream. Furthermore the operative expenditure is low on account of the comparatively low throughput of bearing lubricant. A further advantage is that impurities in the bearing lubricant circuit can be removed promptly. A purification in the side stream is in particular sensible if a fairly low level of contamination is to be expected.

If all increased degree of contamination is to be expected, it is favourable for process technology reasons to perform a purification in the full flow.

It is also possible to carry out the method according to the invention in the form of a batch-wise purification. In a batch-wise purification a defined amount of the bearing lubricant can be purified in a very thorough method. In addition it is possible to carry out the purification spatially separate from equipment in which the bearing lubricant is used. This allows an increased flexibility as regards the structural arrangement of the metal working equipment.

A major advantage of the method according to the invention is that a good separation performance can already be achieved with the products normally used as bearing lubricants, for example mineral oils and mineral oil-based products. In this way, with the method according to the invention continuity can be maintained with the lubricants hitherto employed in the prior art and the experience gained therewith.

In order to avoid the formation of several phases in the event of a leakage of bearing lubricant into the cooling lubricant, it is advantageous to use bearing lubricants that are soluble in an amount of at least 5%, preferably at least 10%, in the cooling lubricant. It is also advantageous to use a cooling lubricant that is soluble in an amount of at least 5% in the bearing lubricant, in order specifically to avoid a formation of several phases and the associated impairment of the lubricating quality of the bearing lubricant in the event of a leakage of cooling lubricant into the bearing lubricant.

A good separation performance is also achieved with synthetic lubricants as bearing lubricants. Products containing polyisobutylene and/or polyalphaolefin have proved to be particularly suitable synthetic bearing lubricants for the method according to the invention. These products can also be employed jointly with mineral oils and/or further components normally used in bearing lubricants.

If polyisobutylene is used as bearing lubricant it is then particularly advantageous that these compounds can be decomposed residue-free by a thermal treatment. In the case of leakages of bearing lubricants into the cooling lubricant this is particularly advantageous with an optionally envisaged thermal post-treatment of the rolled strip.

In addition bearing lubricants based on polyisobutylene are characterised by a good miscibility with mineral oils. The application range of these bearing lubricants is thereby increased. Furthermore bearing lubricants based on polyisobutylene also have a good miscibility with the products normally used as cooling lubricant. This is particularly advantageous since in this way the risk of formation of two phases in the event of leakage of cooling lubricant into the bearing lubricant system can be excluded. Furthermore a rupture of the lubricating film due to the phase separation can also be reliably prevented.

However, the use of polyisobutylene-based bearing lubricants in aluminium cold rolling mills has the following disadvantages:

if polyisobutylene contamination of the cooling lubricant due for example to a leakage in the bearing lubricant system and/or if the temperatures in the thermal treatment of the rolled strip are too low, this may lead to the formation of residues, as a result of which the surface quality of the rolled strip can be adversely affected;

polyisobutylene residues on surfaces have the consistency of a sticky substance, which means that the use of polyisobutylene-based products in the aluminium cold rolling mill sector may result in an increased handling effort;

like the normally employed bearing lubricants based on mineral oils, polyisobutylene contamination in the cooling lubricant cannot be removed via the cooling lubricant filtration.

There is therefore a need for further bearing lubricants, in particular bearing lubricants for oil-flood lubricated bearings in equipment for metal working, that have a sufficient compatibility with the products normally used as cooling lubricants. In addition possible contaminations of the bearing, lubricant with cooling lubricant should be easily removable via the method according to the invention. Above all however contaminations of the cooling lubricant by bearing lubricants, for example leakages of bearing lubricant into the cooling lubricant, should be removable in a simple manner, preferably by a cooling lubricant filtration.

This object is achieved according to a further teaching of the invention by the provision of a bearing lubricant that contains at least one synthetic oil comprising carbon and oxygen with a kinematic viscosity of 60 to 220 mm²/sec, preferably of 70 to 150 mm²/sec, at 40° C. measured according to DIN 51562-1, a ratio of oxygen to carbon of at least 1 to 12, preferably at least 1 to 10, and a mean molecular weight of 1200 to 3500 g/mole, as well as at least one oxidation inhibitor with a flash point at 1 atmosphere of at least 150° C., preferably of at least 170° C. and in particular of at least 190° C.

The bearing lubricant according to the invention has a sufficient compatibility with the products normally used as cooling, lubricant, for example hydrocarbon mixtures, which is advantageous especially in the event of a leakage from the bearing lubricant and cooling lubricant circuits.

In addition the products normally used as cooling lubricant can be separated in a simple way from this bearing lubricant by the method according to the invention.

The bearing lubricant according to the invention is in particular especially suitable for a thermal separation of cooling lubricant from the bearing lubricant. Above all however the bearing lubricant according to the invention can be removed from the cooling lubricant in a simple manner, preferably by a cooling lubricant filtration, in the case of contaminations of the cooling lubricant by leakages of bearing lubricant. This possibility arises insofar as for the cooling lubricant filtration filter aids are used on which the bearing lubricants according to the invention are adsorbed.

This applies in particular to the use of filter aid mixtures containing inter alia also filter aids based on bleaching clays.

According to a preferred embodiment of the invention the bearing lubricant according to the invention contains a corrosion inhibitor.

Conventional corrosion inhibitors are suitable as corrosion inhibitors. Preferably the corrosion inhibitors have an initial boiling point at 1 atmosphere of at least 150° C., preferably of at least 150° C. Thus, for example, nitrogen compounds are suitable, preferably basic nitrogen compounds such as tertiary amines and their salts of benzoic, salicylic or naphthenic acids, esters of fatty, naphthenic or dicarboxylic acids with triethanolamine, alkaline earth phthalylalkylamides, aminodicarboxylic acids, dicyclohoxylamine as well as diamides of heterocyclic hydroxyamines and imino esters, amides, amidoximes and diaminoethane derivatives.

Also suitable are fatty acid amides in particular amides of saturated fatty acids with alkanolamines, alkylamines, sarcosine or imidazolines.

Also suitable are phosphoric acid derivatives, in particular diaryl phosphates and thiophosphoric acid esters or neutral salts of primary n-alkylamines ($C_8$-$C_{18}$) or of cycloalkylamines with dialkyl phosphates.

Also suitable are sulphonic acids or other sulphur compounds. Also suitable are combinations of Ba sulphonates and polyoxyethylated alkylphenols, reaction products of dipentene with sulphur in the presence of activated aluminium, combinations of Ba octytphenol sulphide, Ca and Na petroleum sulphonate, alkylmercapto- and alkylsulfinyl acetic acids, as well as mixtures of oil-soluble alkali or alkaline earth metal sulphonates, fatty acids with ethylenediamine (sarcosines) or diethylenetriamine.

Also suitable are carboxylic acid derivatives, in particular napthenic acids, calcium naphthenates, zinc salts, hydroxy- and ketocarboxylic acids, dicarboxylic acids, maleic acid, unsaturated fatty acids, hydroxy fatty acids as well as esters of all of these acids, pentaerythritol and sorbitan monooleates and O-stearoyl-alkylolamines, polyisobutenyl succinic acid derivatives, mixtures of the dicarboxylic acid and its mono-2-hydroxyisopropyl ester, p-alkyl-phenoxycarboxylic acid, in particular —acetic acids.

The amount of the corrosion inhibitor that is used may vary. Particularly advantageous are amounts of less than 5 weight %, and in particular amounts of 0.1 to 2 weight %.

In addition the bearing lubricant may contain conventional additives such as high-pressure additives/high-pressure agents, antiwear additives, friction-reducing agents, adhesive agents, viscosity indes improvers, detergents, demulsifiers, emulsifiers, non-ferrous metal inhibitors and/or antifoaming agents, preferably in an amount of less than 5 weight %, and in particular in an amount of 0.1 to 2 weight %. It is particularly preferred to use additives that have a flash point at 1 atmosphere of at least 150° C., preferably of at least 170° C. and in particular of at least 190° C. In this way the thermal separability of the bearing lubricant and of the cooling lubricant from the additives is not adversely affected.

The bearing lubricant according to the invention contains at least one oxidation inhibitor. The known oxidation inhibitors are suitable as oxidation inhibitors so long as they have a flash point at 1 atmosphere of at least 150° C., preferably of at least 170° C. and in particular of at least 190° C.

Thus, for example, sulphur compounds, in particular dialkyl sulphides, —polysulphides, diaryl sulphides, modified mercaptans, mercaptobenzimidazoles, thiophene derivatives, xanthogenates, zinc dialkyl dithiocarbamates, thioglycols and thioaldehydes. Of the alkyl aromatic S compounds, dibenzyl disulphide should be mentioned. Alkylphenol sulphides are also suitable. 4,4'-thio-bis(2-tert.-butyl)-5-methylphenol is particularly suitable. Also suitable are 2-mercaptobenzimidazole mercaptotriazines, reaction products of benzotriazole-alkyl-vinyl ethers or esters, 10H-phenothiazine and its alkyl derivatives and also 3,3'-thio-bis-(propionic acid dodecyl ester) and bis-(3,5-di-tert.-butyl-4-hydroxybenzyl)-malonic acid bis-(3-thiapentadecyl) ester. Also suitable are sulphoxides, preferably in combination with aromatic amines.

Also suitable are phosphorus compounds, such as preferably triaryl and trialkyl phosphites, phosphoric acid/phenol derivatives such as 3,5-di-tert.-butyl-4-hydroxybenzyl-phosphonic acid dialkyl esters or also phosphonic acid dipiperazides.

Also suitable are sulphur-phosphorus compounds such as metal salts of thiophosphoric acid compounds, in particular zinc dialkyl dithio phosphates. Also suitable are Zn and Ba dialkyl dithio phosphates. Also suitable are reaction products of $P_2S_5$ with terpenes (dipentene, α-pinene), polybutenes, olefins and unsaturated esters, especially the terpene and polybutene reaction products.

Also suitable are phenol derivatives, in particular sterically hindered monohydric and also dihydric and trihydric phenols, sterically hindered dinuclear and trinuclear and also polynuclear phenols. Particularly suitable are polyalkyl phenols, in particular methylene-4,4'-bis-(2,6-di-tert.-butylphenol). Outstanding results are obtained with 2,6-di-tert-butyl-4-methylphenol. Bisphenols or trisphenols, and also esters of 3-(3,5-di-tert-butyl-4-hydroxyphenyl)-propionic acid as well as 2,6-di-tert-butyl-4-(dimethylaminomethyl)-phenol are preferred at higher temperatures. The reaction product of alkylthiohydroquinone and butylamine is also suitable.

Also suitable are amines, in particular oil-soluble amines such as diphenylamine, phenyl-α-napthylamine, p,p'-tetramethyldiaminodiphenylmethane. Alkylated ($C_8$,$C_9$) diphenylamines and N,N'-diphenyl-p-phenylenediamine are suitable especially at higher temperatures.

Practical tests have shown that particularly good results can be achieved with high boiling point phenolic oxidation inhibitors with a flash point of at least 150° C., both as regards protecting the bearing lubricant against ageing due to thermal load in the bearing and in the thermal separation of bearing lubricant and cooling lubricant, and also as regards the efficiency of the thermal separation of bearing lubricant and bearing lubricant additives from the cooling lubricant.

In addition practical tests have shown that particularly good results are achieved as regards protecting the bearing lubricant against ageing due to thermal load in the bearing and in the thermal separation of bearing lubricant and cooling lubricant, if a high boiling point amine oxidation inhibitor with a flash point of at least 150° C. is used in addition to a phenolic oxidation inhibitor. Preferably in a concentration of 0.1 to 3 weight %, in particular 0.5 to 1.5 weight %. The use of an alkylated diphenylamine in a concentration of 0.5 to 1.5 weight is most particularly preferred.

The concentration of the oxidation inhibitor in the bearing lubricant is preferably 0.1 to 3 weight preferably 0.5 to 1.5 weight %.

According to a preferred embodiment of the invention the bearing lubricant comprises a synthetic oil with a ratio of oxygen to carbon of 1 to 12 to 1 to 1, preferably of 1 to 5 to 1 to 2, and especially of 1 to 4 to 1 to 2.5. Such a bearing lubricant still has a sufficient compatibility with the products conventionally used as cooling lubricant, for example mineral oils. In addition cooling lubricants can be separated particularly easily from such a bearing lubricant. Most importantly however such a bearing lubricant can be removed in a simple manner, preferably by a cooling lubricant filtration using filter aids, in the event of contamination of the cooling lubricant by bearing lubricant. This applies in particular to the use of filter aid mixtures that contain, inter alia, also filter aids based on bleaching clays.

According to a further preferred embodiment of the invention the bearing lubricant at 40° C. has a kinematic viscosity of 60 to 220 mm$^2$/sec, preferably 70 to 150 mm$^2$/sec.

Practical tests have shown that particularly good results can be achieved with polyalkylene glycol, carboxylic acid esters, preferably diesters and/or polyol esters, especially esters of a $C_4$-$C_{20}$ alcohol with a $C_6$-$C_{22}$ dicarboxylic acid and/or esters of a $C_2$-$C_{10}$ polyhydroxy alcohol with a $C_6$-$C_{36}$ monocarboxylic and/or dicarboxylic acid.

An advantage of the use of polyalkylene glycol, for which the abbreviation "polyglycol" is often used in the literature, is that leakages of the cooling lubricant into the bearing lubricant can be removed in a simple way by means of the method according to the invention. It is particularly advantageous that in the event of leakages of the bearing lubricant into the cooling lubricant, the viscosity of the cooling lubricant, and also its compatibility with an optionally provided subsequent thermal treatment of the rolled strip, for example an aluminium rolled strip, is scarcely impaired.

This is based on the fact that polyalkylene glycol contaminations in the cooling lubricant as a result of a leakage of bearing lubricant can be removed from the cooling lubricant in a particularly simple and effective manner via a cooling lubricant filtration. It is particularly suitable for this purpose to carry out a full flow filtration as precoat filtration, preferably using filter aids, preferably with the partial or complete use of filtration aids based on bleaching clays. In addition polyalkylene glycol has the advantage that in the thermal treatment of the rolled strip it decomposes, i.e. polyalkylene glycol is classed as "annealing friendly".

A further advantage of the use of polyalkylene glycol is that polyalkylene glycol has a particularly high viscosity index compared to mineral oils. A high viscosity of the bearing lubricant can thus be adjusted by the use of polyalkylene glycol, which has a positive effect on the temperature range that can be employed in a bearing lubricant system.

In addition an interference of the operation of equipment for metal working, in particular the production of aluminium rolled products in aluminium cold rolling mills, due to the leakage of bearing lubricants, in particular bearing oils from the oil-flood lubricated bearings for roll necks, into the cooling lubricant can be reduced by the use of polyalkylene glycol. In particular polyalkylene glycol increases the process reliability of rolling processes, since with its use an increase in viscosity due to leakages can be kept low or can even be completely avoided. In addition the purity of the cooling lubricant can be improved by their, which meets the requirements demanded by customers. Finally, the costs of replacing or reconditioning of the cooling lubricant filling are reduced, and especially in the production of aluminium foils it is possible to shorten the subsequent thermal treatment, for example by means of a degreasing annealing.

Particularly good results are achieved with polyalkylene glycol if it is used as bearing lubricant in lubricating circuits in equipment for metal working, for example in oil-flood lubricated bearings for roll necks in aluminium cold rolling mills. In particular in the case of these lubricant circuits a leakage from the lubricant circuit into the cooling lubricant and also a leakage of cooling lubricant into the bearing lubricant cannot be completely prevented according to the present prior art.

If a bearing lubricant containing polyalkylene glycol is employed, then the use of polyalkylene glycol with a mean molecular weight of 1200 to 3500, more preferably of 1000 to 3000 g/mole, and in particular of 1200 to 2500 g/mole, has proved particularly advantageous.

Outstanding results are achieved with polyethylene glycol, polypropylene glycol, polybutylene glycol, especially butanol-initiated polypropylene glycol, polytetramethylene glycol, and/or block polymers and/or copolymers thereof.

In particular the polymerisation of ethylene and propylene oxide in a ratio of 0:1 to 4:1, preferably of 0:1 to 2:1, more preferably of 0:1 to 1:1 and especially of 0:1, is suitable for the production of the polyalkylene glycol.

The miscibility with the cooling lubricant can be improved and thus the risk of the formation of two phases can be reduced by adjusting the ethylene oxide/propylene oxides (EO:PO) ratio. In addition the miscibility with the respectively employed cooling lubricant can be specifically adjusted by the choice of the EO:PO ration.

Outstanding results are also achieved with synthetic oils that have a content of ether groups, measured as the mass of the C—O—C bonded oxygen referred to the molecular weight, of 20 to 40%, preferably of 20 to 30%.

Good results are also obtained with synthetic oils that contain carboxylic acid esters, preferably diesters and/or polyol esters, especially esters of a $C_4$-$C_{20}$ alcohol with $C_6$-$C_{22}$ dicarboxylic acid and/or esters of a $C_2$-$C_{10}$ polyhydroxy alcohol with a $C_6$-$C_{36}$ monocarboxylic and/or dicarboxylic acid.

In contrast to mineral oils, polyalphaolefins or polyisobutylenes such synthetic oils possess "polar", oxygen-containing molecule groups and thus have the potential to be removed, in the event of a leakage into the cooling lubricant via the cooling lubricant filtration. In addition the synthetic mineral oils that contain polyesters also have the property that under thermal treatment they decompose in a nearly residue-free manner.

In an advantageous modification of the bearing lubricant this preferably consists in an amount of more than 5% of synthetic carboxylic acid esters such as diesters, polyol esters or complex esters, in which in turn the cooling lubricant is more than 5% soluble.

The bearing lubricant according to the invention can in principle have widely varying flash points. A separation behaviour of possible cooling lubricant contaminations that is advantageous for a thermal separation method can be adjusted by the choice of the flash point of the bearing lubricant. The boiling point of the bearing lubricant and also the boiling points of optionally admixed additives and further constituents are preferably chosen so that they do not have a temperature range that overlaps with the boiling point of the cooling lubricant.

Preferably a bearing lubricant is chosen having an initial boiling point that is as far as possible significantly above the end boiling point of the cooling lubricant and the optionally present cooling lubricant additives. It is also preferred that the additives and further constituents that are optionally added to the bearing lubricant have a boiling point or an initial boiling point that lies significantly above the end boiling point of the cooling lubricant and cooling lubricant additives.

It is particularly advantageous if the flash point of the bearing lubricant at 1 atmosphere is at least 150° C., preferably at least 170° C. and in particular at least 190° C. In this way the thermal separation method can be carried out particularly effectively.

The amount of the synthetic oil in the bearing lubricant can vary within wide limits. Practical tests have shown that the amount of the synthetic oil in the bearing lubricant is preferably at least 5 weight %, preferably at least 50 weight %, more preferably at least 90 weight % and in particular at least 95 weight % to 99.5 weight %.

It is also advantageous if the bearing lubricant decomposes substantially residue-free at temperatures from 250° C. to 350° C.

The bearing lubricant according to the invention is outstandingly suitable as oil-flood lubricated bearing lubricant in equipment for metal working, in particular in cold rolling mills. It is particularly advantageous that cooling lubricant can be separated from the bearing lubricant in a particularly simple manner by means of the method according to the invention, and that bearing lubricants according to the invention can be separated from the cooling lubricant in a particularly simple manner via the cooling lubricant filtration.

As regards further advantageous embodiments or advantageous effects of the bearing lubricant according to the invention, reference is made to the remarks about the separation method according to the invention.

Series of tests of the exemplary use, which should not however be regarded as restrictive, of polyalkyleneglycol-based bearing lubricants in aluminium cold rolling mills with bearings with oil-film bearing lubrication systems have shown that a contamination of the bearing lubricant by cooling lubricant can be restricted to less than 1% when using the method according to the invention. At the same time the bearing lubricant could be restricted to residual contents of less than 0.5% in the cooling lubricants by using the cooling lubricant filtration based on filter aids.

Thus, in exemplary laboratory tests it was possible by means of the method of short-path distillation to remove cooling lubricant from bearing lubricant based on polyalkylene glycol to residual contents of less than 0.5%. The short-path distillation was operated at a pressure of 5 mbar at temperatures of less than or equal to 120° C., in particular between 25 and 120° C., or at a pressure of 1 mbar at temperatures of less than or equal to 100° C., in particular between 25 and 100° C.

What is claimed is:

1. Method for reconditioning bearing lubricants that can be used in equipment for metal working, wherein the cooling lubricant that can be used in equipment for metal working is separated from the bearing lubricant wherein
   a. as bearing lubricant there is used a bearing lubricant whose flash point at 1 atmosphere is at least 150° C. and lies at least 50° C. higher than the flash point of the used cooling lubricant, the bearing lubricant contains at least one oxidation inhibitor with a flash point at 1 atmosphere of at least 150° C., and the bearing lubricant contains at least one synthetic oil selected from polyalkylenglycol;
   b. as cooling lubricant there is used a non water-miscible cooling lubricant according to DIN 51385 that at 40° C. has a kinematic viscosity according to DIN 51562-T1 of at most 10 mm$^2$/sec; and
   c. the separation of the cooling lubricant from the bearing lubricant is carried out by means of a distillative method which is carried out at a temperature of at most 150° C.

2. Method according to claim 1, wherein the distillative separation of the cooling lubricant is carried out at a pressure of less than 5 mbar.

3. Method according to claim 1, wherein the distillative separation of the cooling lubricant is carried out by means of thin-film distillation, short-path distillation and/or by means of a falling film evaporator.

4. Method according to claim 1, wherein as bearing lubricant there is used a bearing lubricant whose flash point lies at least 70° C. higher than the flash point of the used cooling lubricant.

5. Method according to claim 1, wherein a cooling lubricant is used that is soluble in an amount of at least 5% in the bearing lubricant and/or that a bearing lubricant is used that is soluble in an amount of at least 5% in the cooling lubricant.

6. Method according to claim 1, wherein the separation of the cooling lubricant is carried out in the side steam.

7. Method according to claim 1, wherein the polyalkylene glycol is selected from polypropylene glycol and butanol-initiated polypropylene glycol.

8. Method according to claim 1, wherein a non water-miscible cooling lubricant according to DIN 51385 is separated.

9. Method according to claim 1, wherein a cooling lubricant that consists at least 80% aliphatic hydrocarbons is separated.

10. Method according to claim 1, wherein a cooling lubricant that at 40° C. has a kinematic viscosity according to DIN 51562-T1 of at most 5 mm$^2$/sec is separated.

* * * * *